May 19, 1953 D. B. HARRIS 2,639,410
MULTICHANNEL TELEMETRIC SYSTEM
Filed Jan. 20, 1950
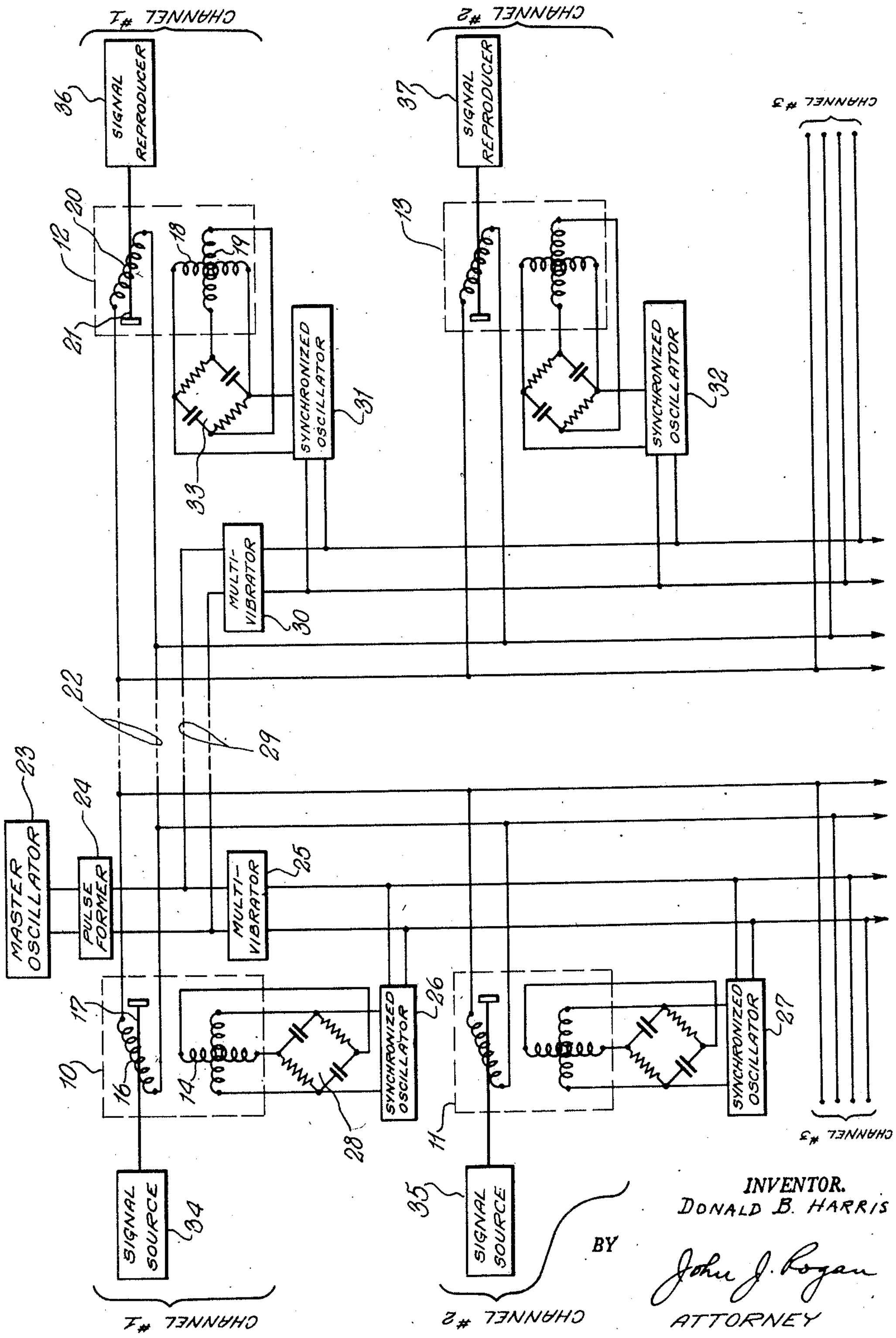
INVENTOR.
DONALD B. HARRIS
BY John J. Rogan
ATTORNEY

Patented May 19, 1953 2,639,410

UNITED STATES PATENT OFFICE 2,639,410

MULTICHANNEL TELEMETRIC SYSTEM

Donald B. Harris, Cedar Rapids, Iowa, assignor to Collins Radio Company, Cedar Rapids, Iowa, a corporation of Iowa Application January 20, 1950, Serial No. 139,712

5 Claims. (Cl. 318—19)

This invention relates to telemetric systems, and more especially to systems for controlling the angular setting of a slave shaft from a master shaft by means of an electrical transmission link.

A principal object of the invention relates to a novel method for independently controlling a multiplicity of slave shafts from respective master shafts using a single electrical link between all the master shafts and all the slave shafts.

Another principal object is to provide an improved and simplified multi-channel synchro system.

Another object is to provide a novel multi-synchro system employing a multiplicity of master synchros and corresponding slave synchros which are interconnected by a single electrical transmission channel, and wherein the slave synchros themselves act as frequency selective demodulators.

A further object relates to a novel frequency multiplexing system for controlling a multiplicity of slave shafts.

A feature of the invention relates to a multi-synchro system having a plurality of master synchros each excited by sine and cosine functions of respective harmonics of a master oscillator frequency to produce in the respective rotor outputs of the master synchros, respective phase modulated carriers. The slave synchros have their rotors all energized in parallel by the received carriers, and the slave synchros themselves act as frequency selective phase demodulators.

Another feature relates to a novel multi-channel phase modulation transmitter employing a plurality of synchros.

Another feature relates to a novel multi-channel phase modulation receiving arrangement employing a plurality of synchros.

A further feature relates to the novel organization, arrangement and relative location and interconnection of parts which cooperate to provide an improved multiplex telemetric system.

Other features and advantages not particularly enumerated, will be apparent after a consideration of the following detailed description and the appended claims.

The single figure of the drawing shows, in schematic wiring diagram and block diagram form a typical embodiment of the invention.

It can be shown that when two carrier frequencies in quadrature relation, for example sine and cosine, are respectively modulated by separate modulating functions, the complex transmitted spectrum can be expressed as follows:

$$e_t = [\Sigma F_{an}(t) \cos nwt + \Sigma F_{bn}(t) \sin nwt] \quad (1)$$

where $e_t$ is the instantaneous voltage of the complex modulated wave, $F_{an}(t)$ is a modulating function identified as being associated with a cosine carrier by subscript $a$, $n$ is any integer, $w$ is the angular frequency of a fundamental carrier wave, and $F_{bn}(t)$ is a modulating function identified as being associated with a sine carrier by subscript $b$, then, in order to demodulate the cosine carriers, it is only necessary to multiply by $\cos nwt$, and integrate, to obtain a demodulator output current, $$I_o = \frac{\gamma_R w}{2\pi} \int_0^{2\pi/w} e_i (\cos nwt)\, dt = \frac{\gamma_R F_{an}(t)}{2} \quad (2)$$

while, if it is desired to demodulate one of the sine carriers, the complex wave is multipled by $\sin nwt$, and the result is integrated to obtain $$I_o = \frac{\gamma_R w}{2\pi} \int_0^{2\pi/w} e_i (\sin nwt)\, dt = \frac{\gamma_R F_{bn}(t)}{2} \quad (3)$$

The factor $\gamma_R$ depends on the characteristics of the demodulating device.

In accordance with one feature of the present invention, the modulating functions are in the form of angular relations for the purpose of producing and demodulating frequency or phase modulated waves which represent the angular orientation of a master shaft. Thus by making the angles of the function $F_{an}(t)$ and the function $F_{bn}(t)$ linear with respect to an original modulating signal, and by selection of a suitable form for these two modulating functions $F_{an}(t)$ and $F_{bn}(t)$, satisfactory phase modulation of a carrier frequency can be achieved while employing conventional amplitude modulation techniques.

Inspection of Equation 1 shows that the modulating functions $F_{an}(t)$ and $F_{bn}(t)$ must, in order to specify fully a modulated wave, have a form of the following general nature:

$$F_{an}(t) = \gamma_T E_{kn} G_n(t) \quad (4)$$

and $$F_{bn}(t) = \gamma_T E_{kn} G_{bn}(t) \quad (5)$$

where $G_{an}(t)$ and $G_{bn}(t)$ are modulating waves, $E_{kn}$ is the carrier amplitude, and $\gamma_T$ is a constant depending on the characteristics of the modulating device. Since there is no restriction on the nature of $F_{an}(t)$ and $F_{bn}(t)$ other than that their rate of change with time must be sufficiently small to permit them to be considered constant during the period of integration, they may in general be any functions of time. For phase modulation purposes, we assign a restricted form to the modulating waves $G_{an}(t)$ and $G_{bn}(t)$ in accordance with the following equations, $$G_{an}(t) = E_{mn} \cos \phi_n \quad (6)$$

and $$G_{bn}(t) = E_{mn} \sin \phi_n \quad (7)$$

where $E_{mn}$ is the amplitude of the modulating wave and $\phi_n$ is the independent variable, the value of which is controlled by the modulating voltage being transmitted. Then the modulating functions become $$F_{an}(t)=\gamma_T E_{kn} E_{mn} \cos \phi_n = E_{on} \cos \phi_n \quad (8)$$

and $$F_{bn}(t)=\gamma_T E_{kn} E_{mn} \sin \phi_n = E_{on} \sin \phi_n \quad (9)$$

where $E_{on}$ is used in place of $\gamma_T E_{kn} E_{mn}$ for the sake of simplicity of notation, and is the maximum amplitude of the modulated envelope. For the moment we need not concern ourselves with the exact relation between $\phi_n$ and the modulating voltage, but merely note that if the modulation process has been carried out in accordance with these relationships, so that the transmitted wave is of the form, $$e_i=[\Sigma E_{on} \cos \phi_n \cos nwt + \Sigma E_{on} \sin \phi_n \sin nwt] \quad (10)$$

then the original phase-dependent modulating functions can be recovered at the receiving terminal by multiplying by a wave having the same frequency and phase as the carrier, and integrating, in the manner of Equations 2 and 3, which are here written in the following form:

$$I_o=\frac{\gamma_R w}{2\pi}\int_0^{2\pi/w} e_i(\cos nwt)dt=\frac{\gamma_R E_{on} \cos \phi_n}{2} \quad (11)$$

and $$I_o=\frac{\gamma_R w}{2\pi}\int_0^{2\pi/w} e_i(\sin nwt)dt=\frac{\gamma_R E_{on} \sin \phi_n}{2} \quad (12)$$

These equations have a particular application, as will be demonstrated later, in the case of data transmission, where it is desired to transmit shaft position information from one point to another. Here, the independent variable, $\phi_n$ is actually the angle of rotation of a shaft, and the modulating waves $E_{mn} \cos \phi_n$ and $E_{mn} \sin \phi_n$ are obtained directly from synchro generators coupled to the shaft. Equations 11 and 12 therefore provide the basis for the operation of a simplified multi-channel synchro system, in which a number of separate shaft positions may be transmitted simultaneously over a common channel on separate carrier frequencies.

A broader application of this principle to the problem of phase modulation in general is discovered by expanding Equation 10 in accordance with the trigonometric identity, $$\cos A \cos B + \sin A \sin B = \cos (AB) \quad (13)$$

which leads immediately to the equation, $$e_i=[\Sigma E_{on} \cos \phi_n \cos nwt + \Sigma E_{on} \sin \phi_n \sin nwt] = \Sigma E_{on} \cos (nwt-\phi_n) \quad (14)$$

This equation states in effect that if a carrier wave is amplitude modulated by a modulating function in which the angle is the independent variable, to produce a first modulation product; and if the same carrier wave in quadrature is amplitude modulated by the same modulating function also in quadrature, to form a second modulation product; then the sum of the first and second modulation products is a phase modulated wave. The importance of the relationship resides in the fact that the actual modulation process in which the modulating function is impressed on the carrier involves amplitude modulation only. Conventional and simple amplitude modulators may therefore be employed in the radio-frequency section to produce the required phase modulation. The preparation of the necessary modulating functions to be applied to the amplitude modulators may be carried out at modulating frequencies.

It remains, of course, to determine just what sort of modulating function we need to create in order to produce, through this process, a phase modulated wave in which the phase deviation is a function of the fundamental modulating voltage, $e_{mn}$. It is immediately seen that the primary requirement is expressed by the equation, $$\phi_n = k e_{mn} \quad (15)$$

where $k$ is a constant depending on the structure of the device employed to set up the modulating function. Since the modulating waves required at the output of this device are specified by Equations 6 and 7, we immediately have, by substitution of (15) in these equations, the requirement that the output of the device, which might be called a "phase converter" must be $$G_{an}(t)=E_{mn} \cos ke_{mn} \quad (16)$$

and $$G_{bn}(t)=E_{mn} \sin ke_{mn} \quad (17)$$

Under these conditions, the equation of the modulated wave becomes $$e_i=\Sigma E_{on} \cos (nwt-ke_{mn}) \quad (18)$$

which is the equation of a phase modulated wave having a phase deviation proportional to the modulating voltage.

Summarizing the requirements of this type of phase-modulation system, it is seen that the first step is the generation, by means of phase converters, of two modulating waves, the instantaneous values of which are proportional respectively to the cosine and to the sine of an angle which in turn is proportional to the modulating voltage. These two modulating waves are used respectively to amplitude modulate a cosine carrier and a sine carrier, and the outputs of the amplitude modulators are added. The result is a phase modulated wave in which the phase deviation is proportional to the original modulating voltage.

The accompanying drawing is a schematic diagram of a multiplex or multi-channel synchro system based upon the principles of Equations 10, 11 and 12, which is capable of transmitting more than one hundred shaft positions over two 3,000-cycle wide lines, or radio channels, without carrier preselection at the receiving stations, and by using the synchros themselves as selective demodulators. Merely for simplicity in the drawing, there are shown two master or transmitting synchros 10, 11, and two corresponding slave or receiving synchros 12, 13. Since such synchros are well-known in the art, detailed description thereof is not required herein. For a detailed description of a typical structure of such a synchro, reference may be had to volume 17 of Radiation Laboratory Series, entitled "Components Handbook," chapter 10, pages 340 et seq., paragraphs 10.12 and 10.13, published by McGraw-Hill Book Company, Inc., New York, New York. It will be understood, of course, that the term "synchro" is used in a generic sense to cover so-called rotary transformers, such for example as those identified in the trade as "Selsyn," "Autosyn," etc. Thus the synchro 10 consists of two stator windings 14, 15, which are mounted in phase quadrature relation. Cooperating with the two stator windings is a rotor winding 16 whose angular orientation with respect to the stator windings can be varied. Thus the winding 16 can be attached to a manually rotatable shaft 17 for varying its angular setting. Likewise, each of the slave synchros, for example synchro 12, comprises a pair of stator windings 18, 19, mounted in phase quadrature relation, and cooperating with a respective rotor winding 20 which is attached to a shaft 21 whose setting is to be controlled from the shaft 17. Merely for simplicity in explanation, the stator windings 14 and 18 will be referred to herein as the vertical windings, and the stator windings 15 and 19 will be referred to herein as the horizontal windings. By energization of the stator windings, for example windings 14 and 15, according to the invention, any particular angular setting of shaft 17 will result in a voltage being transmitted over the line or transmission channel 22 which is common to all the synchros. Likewise, by energization of the stator windings of the slave synchros, according to the invention, these transmitted voltages set up corresponding torques in the shafts of the slave synchros, which thereupon assume the same angular setting as the corresponding master synchro shaft. Merely for simplicity, the master synchros will be referred to herein as transmitting synchros, and the slave synchros will be referred to as receiving synchros.

A master oscillator 23 of any well-known type, controls the system. For a detailed description of a typical master oscillator, reference may be had to "Ultra-High Frequency Techniques" by Brainerd, Koehler, Reich, and Woodruff, twenty-first print, page 206; published by D. Van Nostrand Company, Inc., 250 Fourth Avenue, New York, N. Y. It will be understood, of course, that any other well-known form of sustained oscillator-generator of highly stabilized frequency may be employed. The sine waves from the oscillator 23 are then converted into corresponding sharp or triggering pulses by any well-known pulse-forming network 24, such for example as disclosed in page 178 of the above-noted publication. It will be understood, of course, that the invention is not limited to any particular way of producing the triggering pulses, and any other well-known triggering pulse source of master frequency may be employed, such for example as disclosed in chapter 4 of the above-identified publication. The triggering pulses are then applied to the input of a multivibrator 25 of any well-known type, preferably of the driven type, such for example as disclosed in "Principles of Radar," by members of the staff of the Radar School, Massachusetts Institute of Technology, second edition, chapter II, pages 2—50 to 2—53, published by McGraw-Hill Book Company, Inc., New York and London. In accordance with the well-known operation of multivibrators, there is produced at the output terminals of multivibrator 25 a non-sinusoidal wave which is rich in harmonics at a fundamental carrier frequency, which for example may be 25 cycles per second. These harmonically related carriers are then applied in parallel to a series of synchronized oscillators 26, 27, there being one of such oscillators for each of the corresponding transmitting synchros. For a detailed disclosure of such a typical oscillator, reference may be had to the above-identified publication "Principles of Radar," chapter VII, page 7—72. The various oscillators 26, 27, etc., are tuned to different harmonics of the fundamental frequency from multivibrator 25. For example, the oscillator 26 may be tuned to the sixteenth harmonic, namely 400 cycles per second; the next oscillator 27 may be tuned to the next succeeding harmonic, so that if 100 synchronized oscillators are employed, they may be respectively tuned to a particular frequency in the range, for example, between 400 and 3,000 cycles per second, corresponding to the range from the sixteenth to the one-hundred and twentieth harmonic of the fundamental frequency from multivibrator 25. The output carrier from each synchronized oscillator, for example oscillator 26, is applied directly across the horizontal stator winding 15 of the associated transmitting synchro, while the oscillator carrier output is applied to the associated vertical stator winding 14 through a phase-shifting network 28 which alters the phase of the carrier by 90 degrees. Therefore the voltages across the horizontal stator 15 and the vertical stator 14 are represented respectively by plus cos $nwt$ and plus sin $nwt$. These sine and cosine carriers induce corresponding voltages in the rotor winding 16 which are thereupon impressed upon the transmission channel 22. At the same time, the sine and cosine carriers from the remaining transmitting synchros 11, etc., are also impressed upon the transmission channel 22.

All these sine and cosine carriers are impressed in parallel upon the rotor windings 20, etc., of the receiving synchros 12, 13, etc. The master frequency pulses from the oscillator 23 are also transmitted over a control or pilot channel 29, and are applied to a multivibrator 30 which may be similar to multivibrator 25. The output of multivibrator 30 is applied in parallel to a series of synchronized oscillators 31, 32, etc., similar and tuned respectively to the corresponding oscillators 26, 27, etc. The output of each oscillator 31, 32, etc., is applied directly to the vertical stator coil 18 of the associated receiving synchro, while the horizontal stator winding 19 of the associated synchro is energized from its synchronized oscillator through a phase-shifting network 33 which displaces the phase by 90 degrees. Thus the voltage across winding 18 is represented as minus cos $nwt$, and the voltage across the winding 19 is plus sin $nwt$. As a result of this energization of the stator windings and of the associated rotor winding and each receiving synchro, each synchro causes its shaft 21 to be turned until it assumes the same angular orientation as that of the corresponding transmitting synchro. As will be explained hereinbelow, each receiving synchro acts in the nature of a multi-channel product demodulator, and selects its own particular modulating function while rejecting those of other channels or transmitting synchros. It will also be shown that the resultant action on each receiving synchro is a steady unidirectional moment which will turn the shaft of each receiving synchro until the torque ceases, leaving each transmitting synchro and its corresponding receiving synchro in alignment at the same angular setting.

In considering the operation of this system, it will be helpful to develop equations expressing the transmitted voltages and received torques in terms which will demonstrate their connection with the theoretical relationships discussed above. This can best be done by first examining the dynamics of the receiving synchros. It is evident that the instantaneous moment $m_n$ tending to move the rotor of the synchro associated with any given channel is the sum of two instantaneous moments, one, $m_{hn}$, due to the flux associated with the horizontal stator coil, and one, $m_{vn}$, due to the flux associated with the vertical stator coil. Employing these definitions, we have $$m_n = m_{hn} + m_{vn} \qquad (19)$$

The magnitudes of these moments are found, from elementary principles of physics, to be respectively $$m_{hn}=k_1\Phi_r\Phi_{hn}\cos\phi'_n \qquad (20)$$

and $$m_{vn}=k_1\Phi_r\Phi_{vn}\sin\phi'_n \qquad (21)$$

where $k_1$ is a constant depending on the structure of the synchro, $\Phi_r$ is the flux generated by current flowing through the rotor, $\Phi_{hn}$ is the flux generated by current flowing through the horizontal stator, $\Phi_{vn}$ is the flux generated by current flowing through the vertical stator, and $\phi'_n$ is the angle between the rotor and the horizontal stator. In turn, the magnitudes of the stator fluxes are given by the equations, $$\Phi_{hn}=k_2e_{hn} \qquad (22)$$

and $$\Phi_{vn}=k_2e_{vn} \qquad (23)$$

where $k_2$ is a constant depending on the structure of the synchro, $e_{hn}$ is the instantaneous voltage impressed across the horizontal coil, and $e_{vn}$ is the instantaneous voltage impressed across the vertical coil.

Substituting (20), (21), (22) and (23) in (19) we have, for the instantaneous total moment tending to move the shaft, $$m_n=k_1k_2\Phi_r[e_{hn}\cos\phi'_n+e_{vn}\sin\phi'_n] \qquad (24)$$

It will be shown later that, if an alternating current operated synchro system be assumed, this equation contains, in addition to a term representing a unidirectional torque, a series of terms representing torques which reverse their directions periodically. It is only the unidirectional torque which tends to move the shaft to a new position; the alternating torques merely cause angular oscillation of the shaft around a mean position determined by the unidirectional torque. If the moment of inertia of the rotor and shaft is sufficiently large, the amplitude of these oscillations is negligibly small. The quantity which controls the rotation of the shaft is therefore not the instantaneous moment $m$, but the average moment, M, taken over a period of time T equal to the period of the oscillatory term of lowest frequency. This average moment evidently is $$M=\frac{1}{T}\int_0^T m_n dt$$

$$=\frac{k_1k_2}{T}\int_0^T \Phi_r[e_{hn}\cos\phi'_n+e_{vn}\sin\phi'_n]dt \qquad (25)$$

It is now necessary to consider the transmitting synchros in order to evaluate $\Phi_r$, $e_{hn}$ and $e_{vn}$. At the transmitting terminal a master oscillator drives a multivibrator which generates a non-sinusoidal wave, rich in harmonics, at a fundamental carrier frequency, which, for example, might be 25 cycles per second. This wave is picked up at each transmitting synchro unit from the oscillator bus, and impressed on a synchronized oscillator which is tuned to a harmonic of the fundamental carrier frequency. Harmonics from the sixteenth to the one-hundred and twentieth lying in the range between 400 and 3,000 cycles per second might, for example, be employed in a practical system. In any case, if the fundamental angular frequency is $w$, the oscillator of any given channel will generate a wave having an angular frequency $nw$, where $n$ is the number of the harmonic selected. The output of each oscillator is therefore given by $$e_{kn}=E_{kn}\cos nwt \qquad (26)$$

where $e_{kn}$ is the instantaneous carrier voltage impressed on the transmitting stators and their associated phasing networks, and $E_{kn}$ is the carrier amplitude.

It is now to be observed that at each transmitting synchro unit, this voltage is impressed on the horizontal stator directly and on the vertical stator through a phase network, which alters the phase of the carrier by 90 degrees. The voltages across the horizontal stator and the vertical stator, assuming negligible losses in the phase network, are therefore $E_{kn}$ cost $nwt$ and $E_{kn}\sin nwt$, respectively. These voltages induce corresponding voltages in the rotor coil which are impressed on the first line or radio channel, where their values are respectively equal to $\gamma_T E_{kn}\cos\phi_n\cos nwt$ and $\gamma_T E_{kn}\sin\phi_n\sin nwt$, $\gamma_T$ being a constant depending on line and circuit characteristics and on the construction of the synchro, and $\phi_n$ being the angle between the rotor and the horizontal stator. The line voltage due to a single synchro unit, then, is $$e_{ln}=\gamma_T E_{kn}\cos\phi_n\cos nwt+\gamma_T E_{kn}\sin\phi_n\sin nwt \qquad (27)$$

Substituting $E_{on}$ for $\gamma_T E_{kn}$, for the sake of brevity, and observing that each of the transmitting synchros will contribute a voltage to the line in accordance with Equation 27 we have, for the total instantaneous line voltage $$e_l=[\Sigma E_{on}\cos\phi_n\cos nwt+\Sigma E_{on}\sin\phi_n\sin nwt] \qquad (28)$$

It is noted that this equation is identical with Equation 10 defining the transmitted wave in the earlier theoretical discussion. This wave is now transmitted to the receiving terminal, where it is impressed in parallel on the rotors of all the receiving synchros. It is this wave which produces the flux $\Phi_r$, generated by current flowing through the rotor of any given receiving synchro. It is seen that if we neglect the line loss, the magnitude of this flux is $$\Phi_r=k_3e_l$$

$$=k_3[\Sigma E_{on}\cos\phi_n\cos nwt+\Sigma E_{on}\sin\phi_n\sin nwt] \qquad (29)$$

where $k_3$ is a constant depending on the construction of the synchro.

The fundamental wave generated by the master oscillator is transmitted over a second line (or radio channel) to the receiving terminal, where it drives a multivibrator, the output of which is impressed in parallel on the inputs of synchronized oscillators associated with the various receiving snychros. These oscillators function in a manner similar to the synchronized oscillators at the transmitting terminal, each producing at its output terminals a wave similar to that defined by Equation 26. In this case, however, the phase network is connected to the horizontal stator rather than to the vertical stator. Neglecting line and circuit losses, the voltages impressed on the receiving horizontal and vertical startors are therefore $$e_{hn}=E_{kn}\sin nwt \qquad (30)$$

and $$e_{vn}=-E_{kn}\cos nwt \qquad (31)$$

We have now determined the values $\Phi_r$, $e_{kn}$, and $e_{vn}$, required for substitution in the equation for the average moment of the receiving shaft (25). Making the substitution, we obtain $$M=\frac{k_1k_2k_3}{T}\int_0^T[\sum E_{on}\cos\phi\cos nwt+\sum E_{on}\sin\phi_n\sin nwt][E_{kn}\sin nwt\cos\phi'_n-E_{kn}\cos nwt\sin\phi'_n \quad (32)$$

If we now let $$k_1k_2k_3E_{kn}=\gamma_R \quad (33)$$

and choose to integrate over one period of the fundamental carrier wave, which is $$T=2\pi/w$$

the equation becomes $$M=\frac{\gamma_R w}{2\pi}\int_0^{2\pi/w}[\sum E_{on}\cos\phi_n\cos nwt+\sum E_{on}\sin\phi_n\sin nwt][\sin nwt\cos\phi'_n-\cos nwt\sin\phi'_n] \quad (34)$$

Reference to Equations 10, 11 and 12 shows that Equation 34 expresses a pair of product demodulation operations. The first term of the second factor of Equation 34 is the multiplying factor of Equation 12, also multiplied by another factor $\cos\phi'_n$. If the expansion is carried out for this term only, it is seen that the result will be that of Equation 12 multiplied by $\cos\phi'_n$. Similarly, expansion involving the second term of the second factor yields the result of Equation 11 multiplied by $-\sin\phi'_n$. The algebraic sum of the two operations is $$M=\frac{\gamma_R E_{on}}{2}[\sin\phi_n\cos\phi'_n-\cos\phi\sin\phi'_n]$$

$$=\frac{\gamma_R E_{on}}{2}[\sin(\phi_n-\phi'_n)] \quad (35)$$

The receiving synchro has thus carried out a multi-channel product demodulation operation, in which it has selected its own particular modulating function, and rejected those of other channels. It is seen that in accordance with Equation 35, the result is a steady, uni-directional moment which will turn the shaft until the two angles become equal, when the angle of the sine function becomes $(\phi_n-\phi'_n)=0$, and the torque ceases, leaving the transmitting and receiving synchros in alignment at the same angle.

It will be understood, of course, that the multivibrators 25 and 30 can be locally synchronized, thus eliminating the necessity of employing a separate synchronizing pilot line 29. Thus each of the multivibrators 25, 30, can be synchronized by a local tuning fork controlled oscillator or crystal controlled oscillator whose frequency stability is such as to eliminate the necessity of transmitting the synchronizing impulses over a separate pilot channel.

While in the foregoing, reference has been made to the fact that the rotors 16 of the transmitting synchros or rotary transformers 10, 11, are controlled manually, it will be understood that they may be controlled by respective signal originating sources represented schematically by the blocks 34, 35, etc. Likewise, if desired, the shafts of the rotors of the receiving synchros 12, 13, can be connected to respective signal reproducing devices represented by the blocks 36, 37, etc.

While one particular embodiment has been described herein, it will be understood that various changes and modifications may be made therein without departing from the spirit and scope of the invention.

What is claimed is:

1. A frequency-division multiplex system of the type described, a plurality of signal-originating channels, a plurality of signal-reproducing channels, a signal transmission channel interconnecting all said originating and reproducing channels, means at each of said originating channels and including a master oscillator to produce thereat a phase-modulated carrier but with the carriers of respectively different frequencies, and means to receive and demodulate said carriers into their respective signal-reproducing channels, the last-mentioned means comprising a series of receiving synchros one for each reproducing channel, each synchro having a pair of stator windings with the stator windings of each synchro excited by respective carriers of the same frequency but displaced in substantial quadrature phase, and means to apply all the phase-modulated carriers from said transmission channel simultaneously to the rotor windings of said receiving synchros, each of said synchros serving in itself as a frequency selective demodulator for a corresponding one of said phase-modulated carriers.

2. A system according to claim 1, in which the means for producing the phase-modulated carrier at each of said originating channels comprises a transmitting synchro having a pair of stator windings and a rotor winding, and means for energizing the stator windings of each transmitting synchro respectively by two local carrier frequencies of quadrature phase displacement.

3. A system according to claim 1, in which the means at each originating channel for producing the respective phase-modulated carriers comprises a corresponding transmitting synchro each synchro having a pair of crossed stator windings and a cooperating angularly adjustable rotor winding, and means to energize the stator windings of each transmitting synchro respectively in quadrature phase from a local source of carrier frequency.

4. A frequency-division multiplex system of the type described, a plurality of transmitting synchros each transmitting synchro having an angularly adjustable rotor secondary winding and a pair of crossed primary stator windings, means including a master oscillator to energize the stator windings of each transmitting synchro by respective equal frequency current components which are displaced in phase quadrature with respect to each other and with the frequency of each pair different from that of the remaining pairs, a plurality of receiving synchros each having an angularly adjustable rotor primary winding and a pair of crossed secondary stator windings, a signal transmission channel connecting all the rotors of the transmitting synchros in parallel to all the rotors of the receiving synchros, means to energize the stator windings of each receiving synchro by a pair of current components of equal frequency but of relative phase quadrature displacement with the components for one receiving synchro of a different frequency from the components for the remaining receiving synchros, each of said receiving synchros serving in itself as a frequency selective demodulator device for a corresponding one of said frequencies which is used to energize said pairs of stator windings and respective signal devices connected to the rotors of the receiving synchros.

5. A frequency-division multiplex system of the type described, a plurality of signal-originating channels, a master oscillator device for generating a series of harmonically-related frequencies, means to supply each originating channel with a particular one of said frequencies and including a corresponding rotary transformer each transformer having a pair of crossed stator primary windings and an angularly adjustable rotor secondary winding, means to supply to the stator windings of each transformer but in respective quadrature phase a corresponding one of said channel frequencies, a plurality of signal-reproducing channels, a signal transmission channel for interconnecting said originating and reproducing channels, and means to couple said reproducing channels to said transmission channel, the last-mentioned means comprising a plurality of receiving synchros each having an angularly adjustable rotor winding connected to said transmission channel and a pair of crossed stator windings coupled to said rotor winding, another device for generating a series of harmonically-related frequencies, and means to supply each pair of stator windings with a particular one of said frequencies but with the excitation of one winding of each pair displaced in quadrature phase with respect to the excitation of the other winding in each pair, each of said synchros serving as the sole frequency selection device for a particular one of said frequencies.

DONALD B. HARRIS.

References Cited in the file of this patent

UNITED STATES PATENTS

| Number | Name | Date |
|---|---|---|
| 1,633,016 | Hartley | June 21, 1927 |
| 1,694,654 | Hammond | Dec. 11, 1928 |
| 2,220,201 | Bliss | Nov. 5, 1940 |
| 2,256,482 | Isbister | Sept. 23, 1941 |
| 2,356,186 | Somers | Aug. 22, 1944 |
| 2,402,973 | Moore | July 2, 1946 |
| 2,407,403 | Compton | Sept. 10, 1946 |
| 2,427,881 | Schmitt | Sept. 23, 1947 |
| 2,534,106 | Cohen | Dec. 12, 1950 |

FOREIGN PATENTS

| Number | Country | Date |
|---|---|---|
| 835,470 | France | Dec. 22, 1938 |